Oct. 23, 1962 L. C. RIDEAN 3,059,680
BUN BORING MACHINE
Filed Feb. 1, 1960
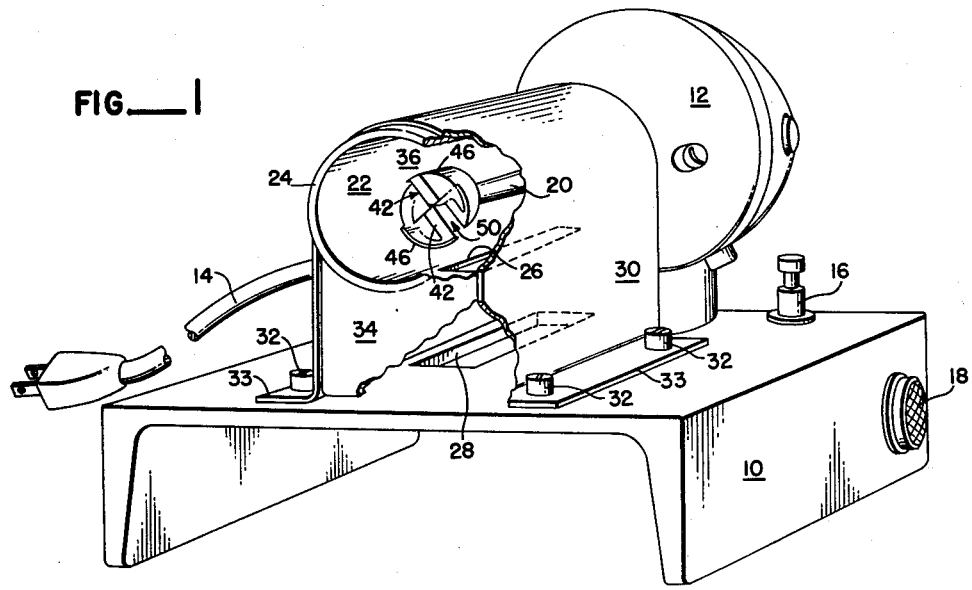
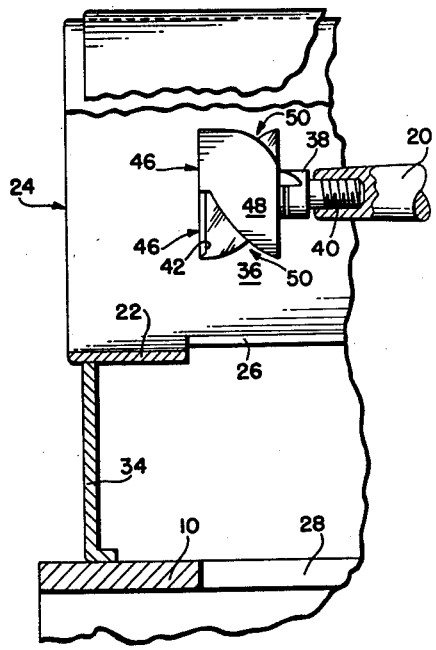
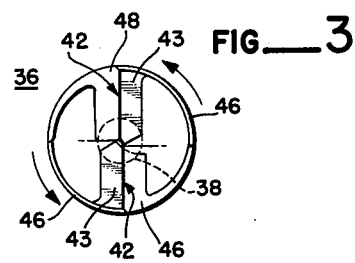
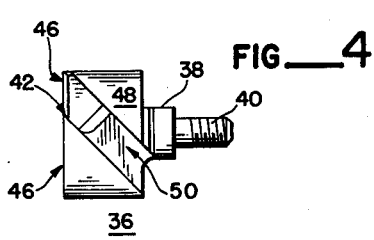
LOUIS C. RIDEAN
INVENTOR.
BY Smith + Tuck United States Patent Office 3,059,680
Patented Oct. 23, 1962

3,059,680
BUN BORING MACHINE
Louis C. Ridean, 17012 72nd Ave. NE., Bothell, Wash.
Filed Feb. 1, 1960, Ser. No. 6,016
5 Claims. (Cl. 146—52)

This invention relates to improvements in the art of boring or coring buns, and, more particularly, to improvements in bun boring machine to hollow out an elongated bun previous to the insertion of a weiner and the seasoning therefor.

The invention resides in the novel machine herein described and hereafter claimed. In the accompanying drawing, to which reference is made in the following specification, is shown a preferred form of a machine embodying the invention.

In the drawing,

FIG. 1 is a perspective view of a bun boring machine, showing a preferred form of the invention;

FIG. 2 is an enlarged side view, partially in section and with parts omitted for convenience of illustration of a portion of the machine of FIG. 1;

FIG. 3 is an enlarged front view of a boring tool; and

FIG. 4 is a side view of the boring tool shown at a right angle to the showing in FIG. 2.

Referring to FIG. 1, inverted U-shaped base 10 supports a motor 12. Electrical current is supplied by the conductor wire 14, the same being in circuit with push-button switch 16 and an indicator jewel 18 which is illuminated during the operation of the motor 12.

Motor shaft 20 extends outward from the motor 12 in overlying relationship to the upper surface of the base 10, and is enclosed in an annular housing 22, which terminates at its adit or entrance opening 24. Housing 22 has an elongated discharge opening 26 which underlies shaft 20 and generally registers above a similar opening 28 in base 10. Bread borings removed from buns being worked upon in this machine pass downwardly through openings 26 and 28 for disposal in a suitable manner.

The annular housing 22 is enclosed in and supported by jacket 30 which is secured to the base by screws 32 that pass through flanges 33 that rest upon base 10. Front wall 34 further encloses the space beneath chamber 22 and forward of the extremities of openings 26 and 28.

The rotary cutter, designated as a whole by the reference character 36, comprises a hub 38 having a threaded shank 40 by which it is attached to the outward end of motor shaft 20. Hub 38, which comprises the central body of the cutter 36, has on its forward or outward end a pair of opposed cutting edges or blades 42, 42 extending opposite to each other radially or on chords only slightly offset of the diameter line or the axis of the hub (see FIG. 3). In other words in the preferred embodiment the cutting edges are located forward of the diameter line so that the blades overlie said diameter line (reference again being had to FIG. 3). The blades 42 are integral with hub 38 and are so arranged that their cutting edges lie in a common plane perpendicular to the axis of rotation. In following relation to the cutting edges of blades 42 the blade bodies are sloped rearward as at 43 to provide clearance behind the cutting edge and to facilitate sharpening. A curved or arcuate wall 46 is provided in trailing relation to the cutting edges of blades 42. Each curved wall 46 is sharpened and is concentric with the axis of rotation of the cutters and is integral with the outer edge of each of the cutting blades 42 and thus is also integral with hub 38. As can be seen in FIG. 2, the forward edge of each wall 46 lies in substantially the same plane as that of the blade edges 42. Walls 46 retrogress rearward and in a curved manner from the point of attachment at the outer end of each associated cutting edge 42.

In FIG. 2 the side view shows the cutter as when the cutting edges 42 are vertically arranged as in FIG. 3. In FIG. 4 the side view is that at a right angle to the showing of FIG. 2, in other words, in line with or as though looking along the cutting edge of a blade 42. In FIG. 4 it will be seen that the trailing portion 48 of curved cutting wall 46 terminates in spaced relation to and behind the other cutting edge 42. In this manner, throat 50 is provided for the passage away from the cutting edges of debris that results from boring buns. Tool 36 is larger in diameter than shaft 20, and has a diameter greater than its thickness as determined by the trailing portions 48.

This cutting device is very effective in the boring of hot dog buns which are, of course, formed of baked bread dough. The action is instituted by the introduction of a bun into the opening 24 of housing 22 against the rotating face of cutter 36. The blades 42 rotating at an extremely high speed bore into the bun and the curved trailing cutting edges 48 facilitate the boring action and insure that the hole being bored is clean, smooth and the walls of the opening are relatively untorn. The debris from the cutting operation at the forward part of the cutter 36 passes rearward through the throat 50, there being one such throat on each of opposite sides of the cutter. When the bun has been inserted into the housing a distance determined to provide a hole therein of the required depth, the bun is withdrawn from the housing. It is customary that the boring operation be performed manually and an operator will usually grasp the end of the bun and insert the opposite end into the housing 22. Due to the spacing of the cutter 36 inward from the opening 24 as shown in FIGS. 1 and 2, injury to the operator is avoided by the fingers coming into contact with the housing 22.

Having thus described the invention, what is claimed is:

1. A bun boring machine, comprising: a motor mounted on a base and having a horizontally disposed rotary shaft overlying a portion of said base; a rotary boring tool larger than said shaft and mounted on the end thereof, said boring tool including a hub having an opposed pair of cutting blades extending therefrom with their cutting edges in a common plane perpendicular to the axis of rotation, each said blade sloping rearward from its cutting edge at an angle relative to said perpendicular plane, each said blade including curved wall means concentric with said axis and integral with the outer edge of the cutting blade and arranged in trailing relation thereto, the forward edge of said wall means being sharpened and lying substantially in the same plane as said cutting blades and the rear edge of said wall means coursing rearward from the plane of said cutter and terminating in spaced relation behind the other cutter blade, housing means enclosing said boring tool and the rotary shaft and having an entrance opening spaced outward of the cutting face of said cutter, said housing means having an opening inward of said boring tool and located beneath said shaft for discharging borings from said housing.

2. A bun boring machine, comprising: a motor mounted on a base and having a horizontally disposed rotary shaft overlying a portion of said base; a rotary boring tool larger than said shaft and mounted on the end thereof, said boring tool including a hub having an opposed pair of cutting blades extending therefrom with their cutting edges in a common plane perpendicular to the axis of rotation, each said blade including curved wall means integral with its outer edge, the forward edge of said wall means being sharpened and lying substantially in the same plane as said cutting blades and the rear edge of said wall means coursing rearward from the plane of said cutter and terminating in spaced relation behind the other cutter blade, housing means enclosing said cutter and the rotary shaft and having an entrance opening spaced outward of the cutting face of said cutter, said housing means having an opening beneath said shaft for discharging borings from said housing.

3. A bun boring machine, comprising: a motor mounted on a base and having a horizontally disposed rotary shaft overlying a portion of said base; a rotary boring tool larger than said shaft and mounted on the end thereof, said boring tool including a hub having an opposed pair of cutting blades extending therefrom with the cutting edges of said blades in a common plane perpendicular to the axis of rotation, the cutting edges of said blades being offset of the diameter line running through said axis, each said blade sloping rearward from its cutting edge at an angle relative to said perpendicular plane, each said blade including curved wall means concentric with said axis and integral with the outer edge of the cutting blade and arranged in trailing relation thereto, the forward edge of said wall means being sharpened and lying substantially in the same plane as said cutting blades and the rear edge of said wall means coursing rearward from the plane of said cutter and terminating in spaced relation behind the other cutter blade, housing means enclosing said boring tool and the rotary shaft and having an entrance opening spaced outward of the cutting face of said cutter, said housing means having an opening inward of said boring tool and located beneath said shaft for discharging borings from said housing.

4. A bun boring machine, comprising: a motor mounted on a base and having a horizontally disposed rotary shaft overlying a portion of said base; a rotary boring tool larger than said shaft and mounted on the end thereof, said boring tool including a hub having an opposed pair of cutting blades extending therefrom with the cutting edges of said blades in a common plane perpendicular to the axis or rotation, the cutting edges of said blades being offset of the diameter line running through said axis, each said blade including curved wall means integral with its outer edge, the forward edge of said wall means being sharpened and lying substantially in the same plane as said cutting blades and the rear edge of said wall means coursing rearward from the plane of said cutter and terminating in spaced relation behind the other cutter blade, housing means enclosing said cutter and the rotary shaft and having an entrance opening spaced outward of the cutting face of said cutter, said housing means having an opening beneath said shaft for discharging borings from said housing.

5. A bun boring machine, comprising: a motor mounted on a base and having a horizontally disposed rotary shaft overlying a portion of said base, said shaft being of substantially small diameter and unobstructed along its entire length; a rotary boring tool of substantially larger diameter than said shaft and mounted on the end of said shaft, said boring tool including a hub having an opposed pair of cutting blades extending therefrom with their cutting edges in a common plane perpendicular to the axis of rotation, each said blade sloping rearward from its cutting edge at an angle relative to said perpendicular plane, each said blade including curved wall means concentric with said axis and integral with the outer edge of the cutting blade and arranged in trailing relation thereto, the forward edge of said wall means being sharpened and lying substantially in the same plane as said cutting blades and the rear edge of said wall means coursing rearward from the plane of said cutter blade, housing means enclosing said boring tool and the rotary shaft and having an entrance opening spaced outward of the cutting face of said cutter, said housing means having an opening inward of said boring tool and located beneath said shaft for discharging borings from said housing.

References Cited in the file of this patent

UNITED STATES PATENTS

| | | |
|---|---|---|
| 309,868 | Olson | Dec. 30, 1884 |
| 815,247 | Zangerle | Mar. 13, 1906 |
| 1,352,825 | Meredith | Sept. 14, 1920 |
| 2,297,158 | McDonald | Sept. 29, 1942 |
| 2,956,600 | McDonald | Oct. 18, 1960 |

FOREIGN PATENTS

| | | |
|---|---|---|
| 515,505 | France | Apr. 2, 1921 |